Feb. 22, 1938.   F. SHURLEY   2,109,360
CONVEYER APPARATUS
Filed Dec. 31, 1935   2 Sheets-Sheet 2
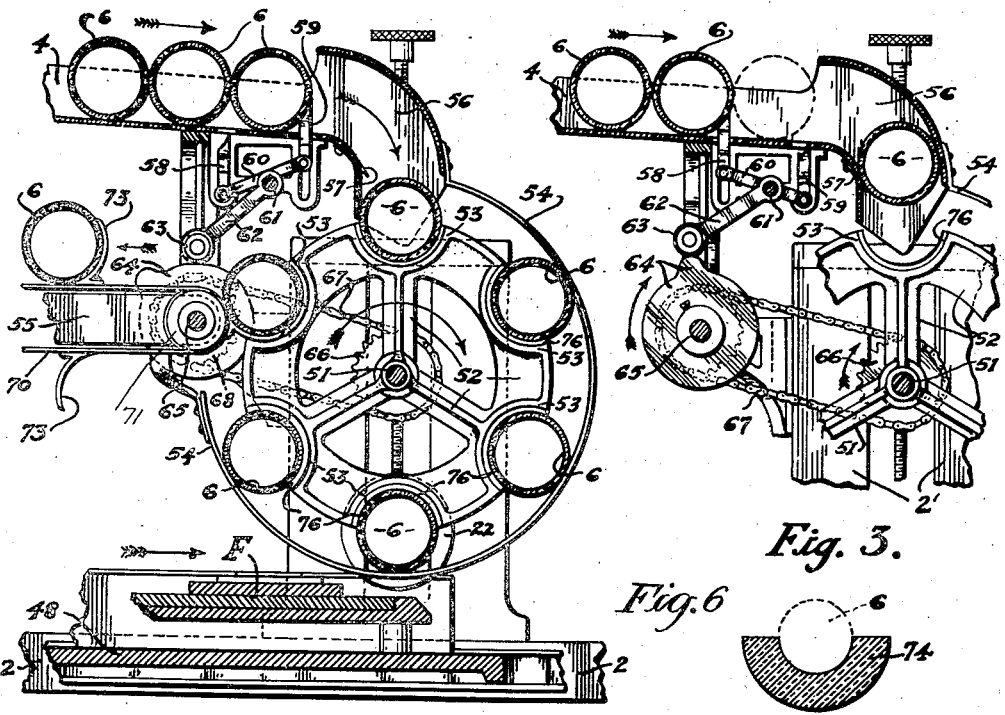
Fig. 2.   Fig. 3.
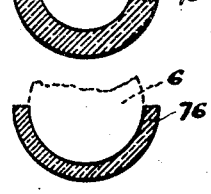
Fig. 6
Fig. 6a
Fig. 6b
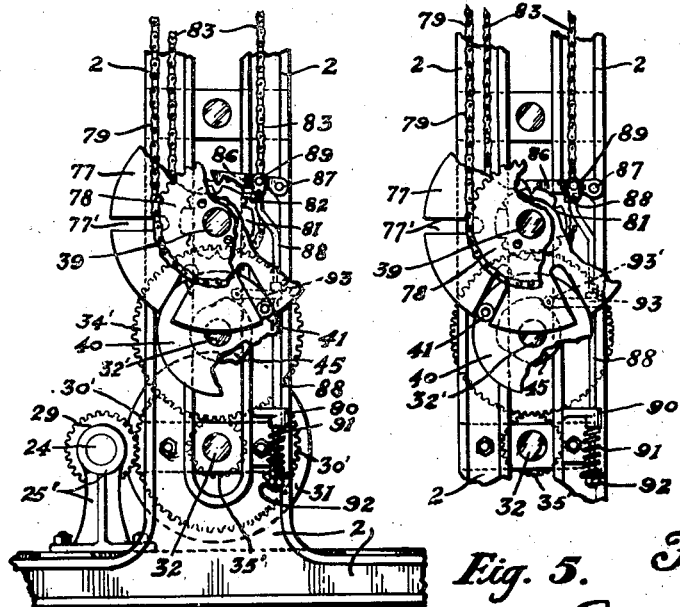
Fig. 4.   Fig. 5.
Inventor
Frederick Shurley.
By Cushman, Hurley & Cushman
Attorney

Patented Feb. 22, 1938

2,109,360

UNITED STATES PATENT OFFICE 2,109,360

CONVEYER APPARATUS

Frederick Shurley, Salt Lake City, Utah, assignor to Ceramic Machinery Distributors Limited, Windsor, Ontario, Canada, a company of Canada Application December 31, 1935, Serial No. 57,016

6 Claims. (Cl. 101—40)

My invention relates particularly to a conveyer and feeding mechanism for feeding bottles and round artitcles to a printing machine. A portion of such a machine is shown in the drawings to illustrate the application of the present invention to a printing machine.

Among the salient objects of the present invention are: to provide a traveling conveyer or carrier wheel, with feeding mechanism which will deliver articles thereto, to receive said articles to be printed and carry them into printing position and then to a place of discharge; to provide in combination therewith feeding mechanism which will deliver said articles one by one to said conveyer or carrier wheel at one position, and another discharge or removing conveyer which will receive and carry said articles away from said conveyer or carrier wheel after the printing operation; to provide in a mechanism of the character referred to a conveyer or carrier wheel with means for intermittently moving it, whereby the deposit of articles thereon and also the printing operation can be accomplished during the pauses in its movements; to provide control means for intermittently, and for a predetermined distance, moving said conveyer or carrier wheel and said articles through a definite course of travel and through a position for the printing operation; and in general, to provide in combination, a conveyer or carrier wheel adapted to receive articles to be printed, to carry them to and hold them in position to be printed, and thereafter to move them on to a place of discharge and do it automatically.

In order to explain my invention, I have illustrated the same in one practical embodiment on the accompanying two sheets of drawings, in which:

Figure 2 is a vertical sectional view through the conveyers, a carrier wheel and the printing mechanism;

Figure 3 is a fragmentary sectional view showing the feed cvontrol mechanism for feeding the articles to the carrier wheel;

Figure 4 is a fragmentary view in side elevation to show the intermittent feeding mechanism;

Figure 5 is a similar view showing the mechanism in a different position; and

Figures 6, 6a and 6b are sectional views through three different thicknesses of inserts or pads for the article, whereby articles of different sizes can be held in the carrier pockets.

I will first describe those portions of the printing machine which are substantially the same as those shown in my pending application, Serial No. 711,136, using the same reference numerals for the same corresponding parts.

Figure 1:
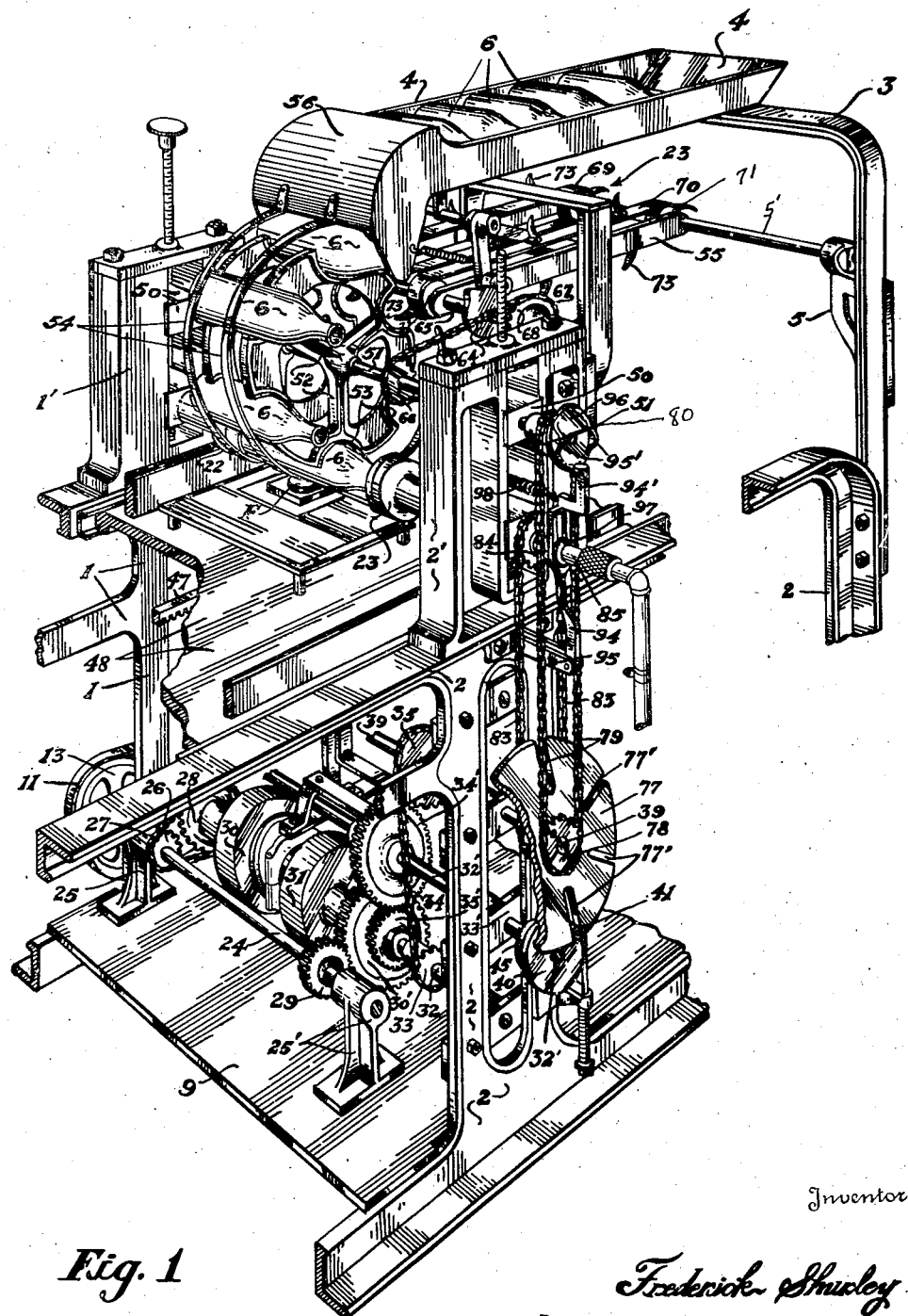
Figure 1 is a perspective view showing my invention as embodied for feeding round articles to a printing machine, a portion of which is also shown to illustrate how the present invention is applied thereto.

The frame members are designated 1 and 2, with the upright extensions 1' and 2', at opposite sides of the main frame, between which are article-holding cups 22 and 23, adapted to be opened and closed axially, to receive and hold therebetween the articles to be printed, as fully desribed in said application. In the lower part of said frame structure is a drive shaft 24, supported in bearings 25 and 25', said shaft having a pulley 13, at one end, and by means of which said shaft is driven through a belt 11, from any suitable power furnishing means.

Mounted on said shaft 24 is a sprocket 26, with a chain 27, to a sprocket 28. A gear 29 is also mounted on said shaft 24, meshing with a gear 30' on a shaft 32, on which shaft 32 are two clutch mechanisms, 30 and 31. A small sprocket 33, on said shaft 32, is connected by means of a sprocket chain 34, to sprocket 35, on shaft 39, on the outer end of which shaft 39 is mounted the mechanism for intermittently turning the carrier wheel, as hereinafter more fully described.

A shaft 32' is also mounted in said frame structure, in bearing supports, as 33', with a gear 34' thereon in mesh with gear 35' on shaft 32. On the outer end of said shaft 32' is mounted a cam 45 and a disc 40, having thereon a roller 41.

The parts thus far described, with the exception of the shaft 32', gear 34', gear 35', cam 45 and disc 40, with its roller 41, are old and are shown and described in the application hereinbefore referred to.

The movable table 48, carries the printing mechanism, designated F, is also shown and described in the other application, said table being moved back and forth by means of a rack 47 thereunder, in the manner described.

It is not deemed to be necessary to describe in detail all of the mechanism of the printing machine of the other application to which reference is made, and for this reason only so much thereof as is in any way connected with the operation of the conveyer and feeding mechanism constituting the invention of this application has been shown and referred to.

I will now describe the invention proper of this application.

Mounted in the upright frame extensions 1' and 2', at opposite sides of the main frame structure 1—2, in adjustable bearings 50—50, is a shaft 51, on which is an article conveyer or carrier wheel 52, consisting of two spaced side portions, having receiving pockets 53, 53, formed therein, there being six pockets shown, to receive the articles, represented as glass bottles, 6, 6, and held in place by spaced outer bands 54, 54.

A frame extension, designated 3, supports the outer end of a feed conveyer or trough, designated 4, which receives the articles 6, 6, and is mounted in an inclined position so that round articles will roll therein toward the carrier wheel 52. On the frame extension 3 is a supporting bracket 5, constituting a bearing support for a shaft 5', for a discharging or removing conveyer, designated as a whole 55, and again referred to.

Referring to Fig. 2, in which the conveyer trough 4 is shown in vertical longitudinal section, it will be seen that the feed end is in the form of an elbow, 56, with a flexible lip or member 57 therein to slacken or cushion the movement of the articles 6 as they roll down into one of the pockets 53. A feed control mechanism is provided for the articles as they approach the elbow portion of the conveyer trough 4. This consists of two vertical fingers 58 and 59, pivotally connected at their lower ends to a rock bar 60, on a shaft 61, to which is connected an operating lever or arm 62, having a roller 63 at its free end which rides on a cam disc 64, on a shaft 65, which constitutes the other conveyer shaft for the discharge conveyer 55. On the shaft 51, which carries the carrier wheel 52, is also a sprocket 66, with a sprocket chain 67 running over another sprocket 68 on said conveyer shaft 65, whereby said carrier wheel is turned, said conveyer shaft 65 is also turned correspondingly, as said sprockets are the same. Thus, as said carrier wheel 52 is turned, said control fingers 58 and 59 are alternately operated to feed, one by one, the bottles or other articles to the carrier wheel, as clearly shown in Fig. 2.

The discharge or removing conveyer 55 has two spaced belts, as 69 and 70, running over suitable pulleys, 71 and 72, having spaced therealong article-engaging fingers, 73, 73, for moving the articles along with said conveyer belts or members 69—70, to the place of discharge, whereby any suitable receiver can be used.

The article-receiving pockets 53, in the carrier wheel 52, may be provided with inserts or pads of soft material, as 74, 75 or 76, of different thicknesses, as shown in Figs. 6 to 6b, whereby articles of different sizes can be handled in said apparatus.

I will now describe the mechanism which intermittently moves the carrier wheel and the articles therein. On the outer end of shaft 39, is loosely mounted a disc 77, having six radial, open slots 77', adapted to be engaged by the roller 41, on the disc 40 on shaft 32'. Each revolution of said disc 40 and its roller 41, rotates the disc 77 one-sixth of a revolution on shaft 39. On the outer end of said shaft 39, outside of and secured to said disc 77, to turn therewith, is a sprocket 78, on which is a chain 79, extending to and running over a sprocket 80, on the shaft 51, which carries the carrier wheel 52, so that when said disc 77 is turned one-sixth of a revolution, said shaft 51 and said carrier wheel 52 are also turned one-sixth of a revolution.

On shaft 39, inside of the disc 77, and turning with said shaft, is mounted a notched disc 81, and a sprocket 82, over which runs a sprocket chain 83, which extends to and runs over a sprocket 84, on the tubular member 85, which carries and operates the article holding cup 23, which also turns the article 6 therewith. In connection with the notched disc 81, is a pawl or latch member 86, pivoted at one end of the frame 2, as at 87. The upper end of a rod 88 is pivotally connected with said latch member 86, as at 89, with its lower end sliding through a bracket 90, on the frame 2, with a coiled spring 91, and nut 92, at its lower end, below said bracket 90, for normally holding said rod and latch in the down position, with the latch in one of the notches of the notched disc 81, as seen in Fig. 5, for holding the shaft 39. On said rod 88, intermediate its ends, is an arm 93, having a roller 93' at its free end, which roller runs on the cam disc 45 on the shaft 32', which arm is shown in light broken lines in Figs. 4 and 5, in the two positions. This arm is operated to intermittently lift the rod and the latch to permit the turning of the shaft 39 a partial turn.

The vacuum cups 22 and 23, which hold the articles therebetween, are opened and closed axially, as fully described in the application referred to. This is accomplished through a fork 94, Fig. 1, pivotally connected at its lower end to a bracket 95, on the frame 2, the upper end of said fork or loop 94 having an extension 94' positioned to be engaged and moved outwardly intermittently by cam portions 95, on a disc or member 96, on shaft 51, as seen in Fig. 1. The yoke portion of said member 94 is in operative connection with a spool or collar 97 on the tubular member 85, whereby said tubular member 85 and the cup 25 are intermittently moved outwardly axially. A spring 98 operates to normally hold said parts inwardly. The sprocket 84 is secured by a key on said tubular member 85, whereby the latter can be moved axially through said sprocket a short distance to move the cup 23 to and from the end of the article 6. This operation is fully described in my pending application for Machine for printing directly on metal or glass and the like, Serial No. 56,833, filed December 30, 1935, a substitute for application Serial No. 711,136, filed February 14, 1934, and this feed conveyer is to work in combination therewith, as before described.

The use and operation of my invention may be briefly described as follows:

The articles to be printed are deposited in the feed trough 4 and roll therein to and through the elbow portion 56 thereof and are permitted to move one by one through said elbow 56 into a receiving pocket 53, as seen in Fig. 2. The control of the feed is accomplished by the fingers 58 and 59, alternately raised and lowered through the cam disc 64, the arm 62, and the rock bar 60, said cam disc being turned with the carrier wheel 52, through the sprockets 66 and 68 and the sprocket chain 67. From this same connection the discharge or removing conveyer 70 is operated to remove the articles 6, 6, after they have been printed. Thus it will be seen that as the article is deposited into the top pocket 53, from the feed chute or elbow 56, it is carried in that pocket around with the carrier wheel, over the printing means at F, and up to the position of discharge, as seen in Fig. 2, where the fingers 73, on the spaced belts 69 and 70, engage and move said article on to said discharge conveyer.

During the movement and when the article 6 reaches the down position, ready to be printed, the cups 22 and 23 are automatically closed in axially on to the opposite ends of said articles, whereby said article is not only held but is turned by the turning of said cups, through the connections included, namely, sprocket 84, chain 83, and sprocket 82, on shaft 39, which is driven by the sprocket 35, chain 34, and sprocket 33 on shaft 32, on which is mounted the clutch mechanisms 30 and 31, fully described in the companion application before referred to.

The carrier wheel 52, on shaft 51 is intermittently turned one-sixth of a revolution by the sprocket chain 79, from the sprocket 78, turning with the disc 77, which is intermittently turned one-sixth of a revolution by the roller 41 on the disc 40, on shaft 32', which is turned by gear 34' in mesh with gear 35' on said shaft 32.

The holding cup 23 is moved axially to and from the end of the article 6, by the pivoted fork 94, when the extension 94' of said fork is engaged by the cam portions 95, on the disc 96, on shaft 51, as before described and as will be clear from the showing in Fig. 1.

It will be understood, of course, that the movements of the various mechanisms are so synchronized that the intermittent turning of the carrier wheel 52 for one-sixth of a revolution, the release of the feed control to discharge an article thereinto, the closing of the cups 22 and 23 on to the article at the bottom of the carrier wheel, the movement of the table 48, which carries the printing means at F, the turning of the article as it passes over the printing means, and the discharge of the printed article from the carrier wheel to the discharge conveyer, are in proper sequence and that the operations are automatic from the time the article is placed in the feed trough 4, to the time it is discharged on to the discharge or removing conveyer 55. This invention makes more efficient and complete the invention shown and described in full in pending application Serial No. 56,833, before referred to.

I do not limit my invention to the details of construction and arrangement shown for descriptive and explanatory purposes, except as I may be limited by the hereto appended claims.

I claim:

1. In combination, a printing table with printing means thereon and mounted to be moved horizontally, a carrier wheel mounted over said table and having receiving pockets to receive round articles to be printed, stationary guide means for retaining said articles in said pockets during the revolution of said carrier wheel, means for intermittently turning said carrier wheel predetermined distances to successively move said articles to printing position over said table, means for turning said articles in said pockets and in engagement with said printing means between intermittent movements of said carrier wheel, and means for removing said articles from said carrier wheel after the printing operation.

2. In combination with a printing table having printing means thereon for printing round articles, of a carrier wheel mounted over said table and having receiving pockets therein to receive round articles to be printed, said pockets holding said articles in parallel relationship to the axis of rotation of said carrier wheel, means for holding said articles in said pockets during the revolution of said carrier wheel, means for intermittently turning said carrier wheel predetermined distances to move said articles one by one to said printing means, means at opposite sides of said printing means for gripping said articles by their ends while the carrier is stationary and turning them in engagement with said printing means, means for automatically operating said gripping means, means for feeding round articles sidewise and one by one to said carrier wheel, and means for automatically lifting said articles one by one from said carrier wheel after said articles have been printed and moved away from the printing means.

3. In combination, a rotary carrier having pockets to receive articles to be printed, a flat printing member movable tangentially with respect to said carrier and means for feeding articles to said carrier and means for removing said articles therefrom after the printing operation.

4. In combination, a rotary carrier having pockets to receive articles to be printed, a flat printing member movable tangentially with respect to said carrier and means for intermittently moving the carrier to move the articles into printing engagement with said printing means.

5. In combination, a rotary carrier having pockets to receive articles to be printed, a flat printing member movable tangentially with respect to said carrier, means for feeding articles one by one to said carrier, means for automatically gripping and holding said articles during the printing operation, and means for removing said articles from said carrier after the printing operation as said carrier moves away from said printing means.

6. In combination, a rotary carrier having pockets to receive articles to be printed, a flat printing member movable tangentially with respect to said carrier, intermittently actuated means to deliver articles to said carrier, means for intermittently and alternately moving said carrier and said printing frame, means for supporting articles in said carrier during the printing operation, and means for removing the articles from said carrier after the printing operation and as said carrier moves away from said printing member.

FREDERICK SHURLEY.